(12) United States Patent
Ziegler et al.

(10) Patent No.: US 7,702,696 B2
(45) Date of Patent: Apr. 20, 2010

(54) EMULATION OF EMPTY DATABASE TABLES USING DATABASE VIEWS

(75) Inventors: Torsten Ziegler, Dlelheim (DE); Frank-Martin Haas, Wiesloch (DE)

(73) Assignee: SAP AG, Walldorf (DE)

( * ) Notice: Subject to any disclaimer, the term of this patent is extended or adjusted under 35 U.S.C. 154(b) by 173 days.

(21) Appl. No.: 11/787,617

(22) Filed: Apr. 16, 2007

(65) Prior Publication Data
US 2008/0256118 A1 Oct. 16, 2008

(51) Int. Cl.
G06F 7/00 (2006.01)
G06F 17/30 (2006.01)
(52) U.S. Cl. ..................................... 707/803
(58) Field of Classification Search ................ None
See application file for complete search history.

(56) References Cited

U.S. PATENT DOCUMENTS 5,953,715 A * 9/1999 Cincinatus et al. ............ 707/3
2002/0052893 A1* 5/2002 Grobler et al. .............. 707/509
2002/0198872 A1* 12/2002 MacNicol et al. .............. 707/3
2003/0046292 A1* 3/2003 Subramanian et al. ...... 707/100
2007/0299858 A1* 12/2007 Norcott ...................... 707/102

* cited by examiner

*Primary Examiner*—Uyen T. Le
(74) *Attorney, Agent, or Firm*—Blakely, Sokoloff, Taylor & Zafman, LLP

(57) ABSTRACT

Methods and a system for managing database usage. The methods and system include receiving a request to create a table, determining the table is an empty table, and storing a pseudo-table in a data store in response to determining the table is empty. The pseudo-table may be a database view. Metadata related to a table may be stored in the pseudo-table to describe characteristics of the table. The pseudo-table occupies less space than a corresponding empty table. The system may implement the methods in middleware transparent to the applications.

20 Claims, 6 Drawing Sheets

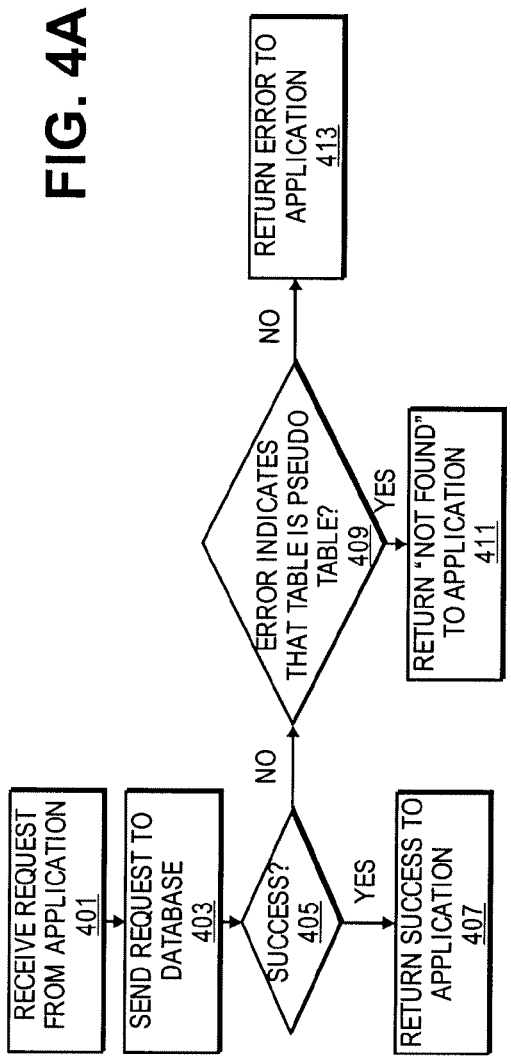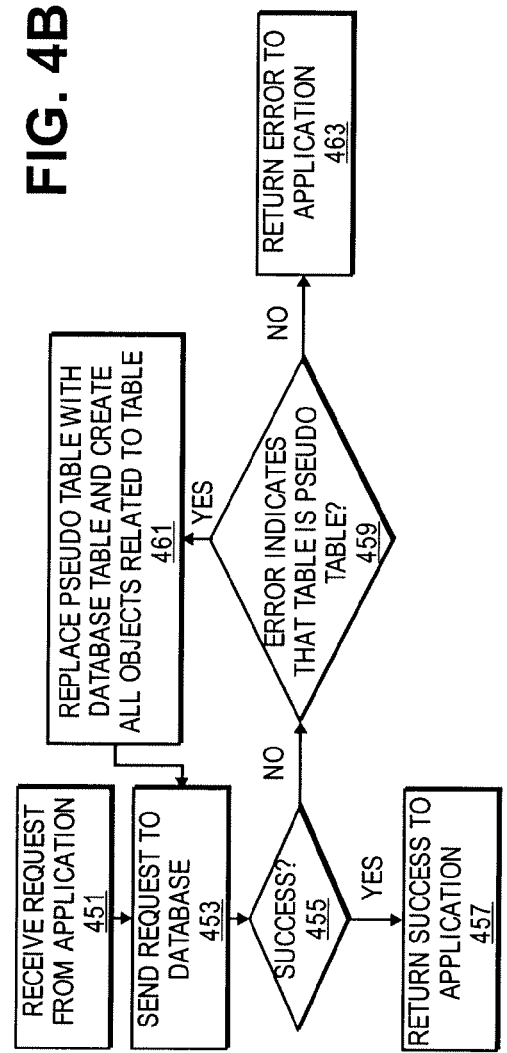

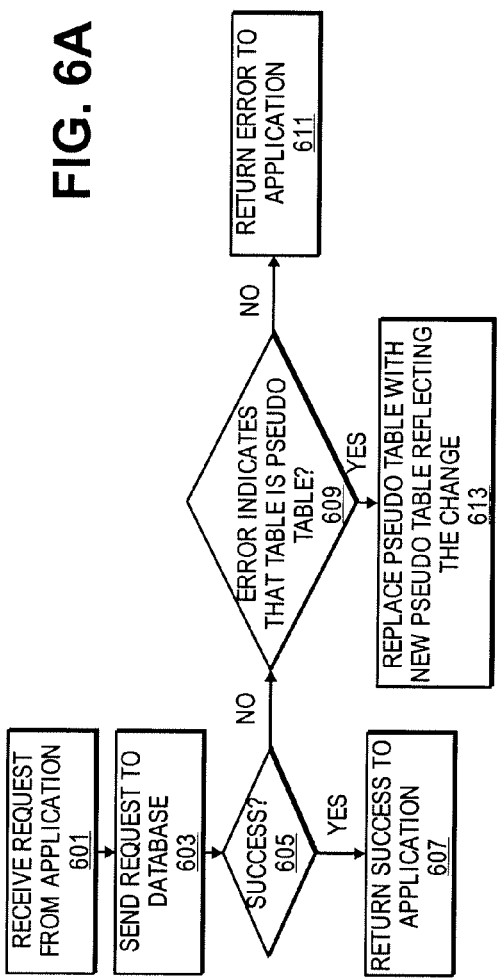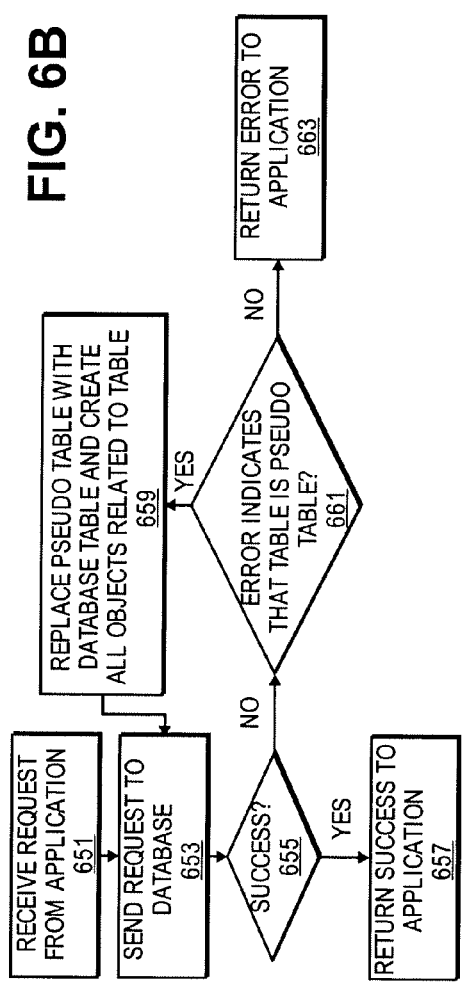

EMULATION OF EMPTY DATABASE TABLES USING DATABASE VIEWS

BACKGROUND

1. Field of the Invention

The embodiments of the invention relate to database management. Specifically, the embodiments of the invention relate to using middleware to conserve resources for maintaining a database.

2. Background

Many applications, operating systems, middleware (e.g. an application server runtime environment) and other programs utilize persistent data and data structures. This persistent data is stored in a persistent storage device such as a hard drive to be retrieved at a later time. This persistent data is often maintained in a database. Relational databases are organized into a set of tables and schemas. Each application, operating system, middleware or other program relies on and maintains its own set of tables.

At the time that an application, operating system or middleware is installed in a system, many of the tables that these programs utilize to store and retrieve data are initialized or created. These tables are generated and stored even if no data is ready to be stored in the table. Empty tables are created to service accesses, queries or similar operations that require the data of these tables. The empty tables include basic data structure data, definitions or metadata needed to maintain the table. These empty tables may occupy extensive physical space on a persistent storage device such as a hard drive. An empty table, i.e., a table with no data stored in the table, may occupy 32 kilobytes to 128 kilobytes or more in the persistent storage device. These numbers may greatly vary depending on the architecture of the relational database system.

A server often executes or supports multiple applications. Each application requiring its own set of tables to be maintained. Each application, individually, often requires a large number of empty tables at start up and during run-time. A large number of these tables remain empty for long periods of time. In aggregate, a server and database system maintain thousands, hundreds of thousands or more of empty tables. These empty tables occupy a large amount of space in the persistent storage devices of the server. The space occupied by these empty tables may occupy up to 10 gigabytes or more of hard drive or similar persistent storage device space.

In addition, the empty tables consume other system resources including processor time. Each table must intermittently have its data structure checked and its metadata updated. Even though these processes are infrequent, if a large number of tables are present in the system the impact on processor availability can be significant.

SUMMARY

Embodiments of the invention include methods and a system for managing database usage. The methods and system include receiving a request to create a table, determining whether the table is an empty table, and storing a pseudo-table in a data store in response to determining the table is empty. The pseudo-table may be a database view. Metadata or similar data related to a table is stored in the pseudo-table to describe characteristics of the table. The pseudo-table occupies less space than a corresponding empty table. The system may implement the methods in middleware transparent to the applications using the system.

BRIEF DESCRIPTION OF THE DRAWINGS

Embodiments of the invention are illustrated by way of example and not by way of limitation in the figures of the accompanying drawings in which like references indicate similar elements. It should be noted that different references to "an" or "one" embodiment in this disclosure are not necessarily to the same embodiment, and such references mean at least one.

FIG. 4A is a diagram of one embodiment of a process for updating or deleting data in a database table.

FIG. 4B is a diagram of another embodiment of a process for updating or deleting data in a database table.

FIG. 6A is a diagram of one embodiment of a process for modification of a table structure or object related to a table.

FIG. 6B is a diagram of another embodiment of a process for modification of a table structure or object related to a table.

DETAILED DESCRIPTION

Figure 1:
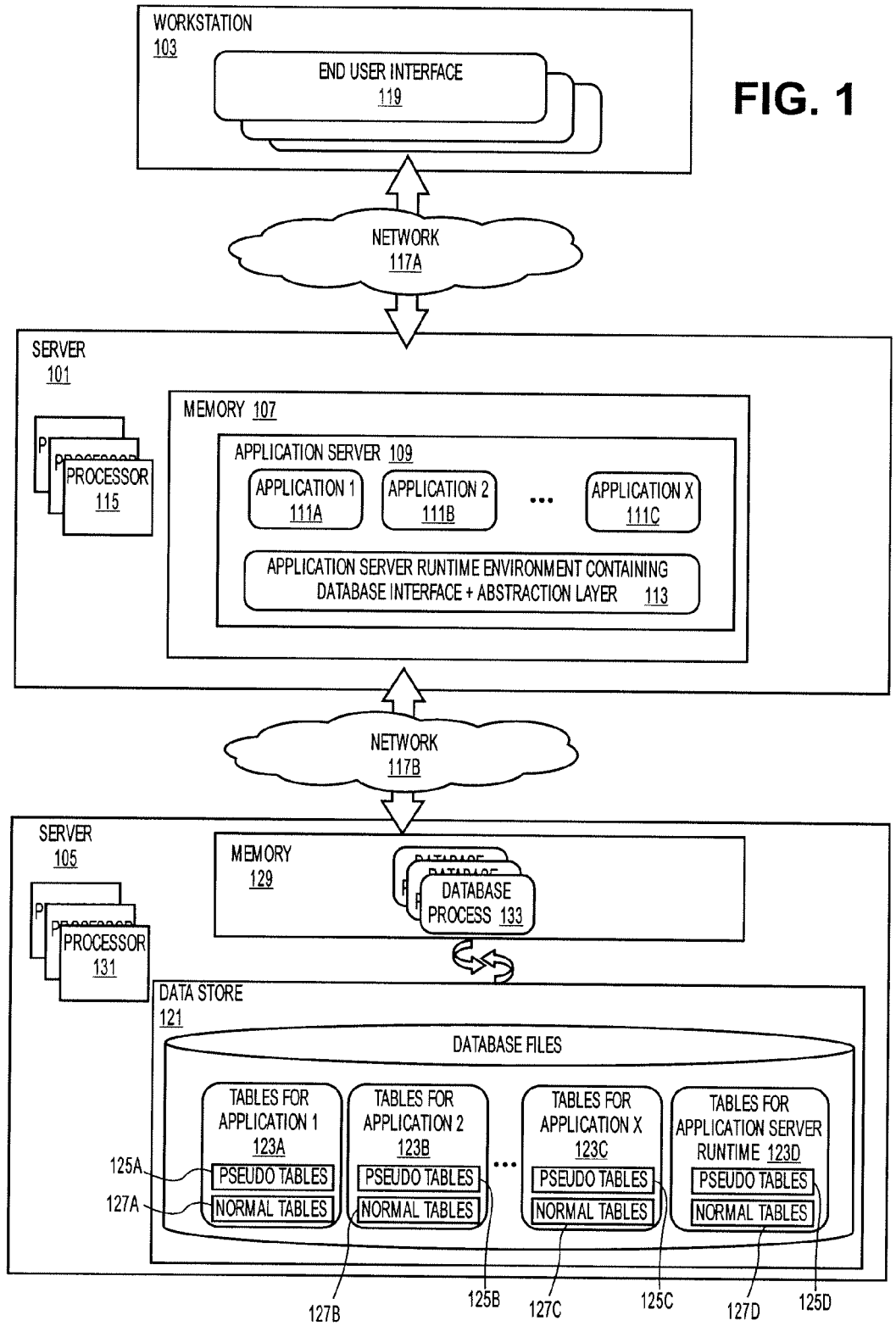
FIG. 1 is a diagram of one embodiment of a database resource conservation system.

FIG. 1 is a diagram of one embodiment of a database resource conservation system. The database resource conservation system includes a set of components that communicate with one another through a set of networks or similar communication channels. As used herein, a 'set' refers to any positive number of items including one item and excluding zero items.

In one embodiment, the system includes middleware in the form of an application server, or more specifically an application server runtime environment 113 that executes and provides resources to a set of applications 111a-111c. As used herein, the term application server is used interchangeably with an application server runtime environment 113. Other types of middleware may perform the functionality described herein with respect to the application server runtime environment 113. For sake of clarity, other implementations and embodiments are not described. One skilled in the art would understand that the principles described in relation to the application runtime server environment 113 are applicable to other middleware and similar programs and could be integrated with operating system functionality, database management systems or applications.

The application middleware or application server runtime environment may be a Java® runtime environment, by Sun Microsystems of Santa Clara, Calif., .Net from Microsoft of Redmond, Wash., C/C++ runtime environment or similar runtime environment. The system can include any number of application servers. Each application server can provide the same runtime environment or different runtime environments. Each application server works with the others to provide the applications 111a-111c and access to the database 121.

The application server runtime environment 113 can be executed on a single server 101 or across a set of servers. The server 101 includes a set of processors 115. The server 101 includes any number of processors 115. The processors 115 execute the application server runtime environment 113 and the applications 111a-111c. The processors 115 access the code and data of the applications 111a-111c and application server runtime environment 113 from the memory 107. The memory 107 encompasses system memory for temporary storage of the code or data, persistent memory for long term storage and any other storage devices in communication with the server 101.

The application server runtime environment 113 runs on top of an operating system (not shown) of the server 101. The operating system manages the system resources of the server 101. The operating system is also executed by the set of processors 115 and utilizes memory 107. The functionality of the application middleware and operating system may be interdependent or interwoven to provide a platform upon which the applications 111a-111c and other programs are executed.

In one embodiment, the applications 111a-111c are accessible to a user through an end user interface 119. The end user interface 119 may be a graphical user interface or similar interface. The end user interface 119 is provided through the application server 109 on the server 101 or remote from the server. In another embodiment, the end user interface 119 is provided through an application or application server on a remote machine 103. The remote machine 103 may be a workstation 103, desktop or similar machine.

Applications 111a-111c may be any type of applications such as supply chain management applications, enterprise applications, web server applications and similar applications. Any number of applications 111a-111c can be provided by the application server. The applications 111a-111c are programs designed to run on Java®, Windows®, Linux, Unix, OS X or programs for similar platforms. Windows® is an operating system by Microsoft Corp. of Redmond, Wash. OS X is an operating system by Apple, Inc. of Cupertino, Calif.

The system includes a database 121 to store tables and data entries that are required by applications 111a-111c and the application server runtime environment 113. Any type relational of database 121 can be utilized. The database 121 is provided by a server 105. In another embodiment, a set of databases may be provided by a single server or set of servers. Also, the server machine that provides the application server runtime environment 113 may also provide the database 121.

The server 105 maintains the database 121 and executes database operations through a set of database processes 133. The database processes 133 are accessed and stored by a set of processors 131 in the server 105. The database processes 133 are stored in and executed from memory 129. The memory 129 encompasses system memory, such as dynamic random access memory (DRAM) and similar volatile memory, persistent storage devices, such as hard drives and similar storage devices and similar types of memory.

The server 105 supports the database 121, which is stored in a persistent storage device in communication with the server 105. The database 121 stores data for each application and application server runtime environment. Each application and application runtime environment may have separate sets of tables 123a-123d. Each set of tables 123a-123d includes tables 127a-127d and pseudo-tables 125a-125d. Normal tables 127a-127d store data entries. Each application and application server runtime environment requires a specific number or set of tables. However, these tables do not store data at all times including at the time they are created at system installation or application deployment. As used herein, 'pseudo-tables' are defined as data structures that stand in the place of the tables and that occupy less space than an empty table in a persistent storage device. Pseudo-tables 125a-125d may be implemented as views or similar data structures. Pseudo-tables consume less space than tables, typically less than 32 kilobytes.

Figure 2:
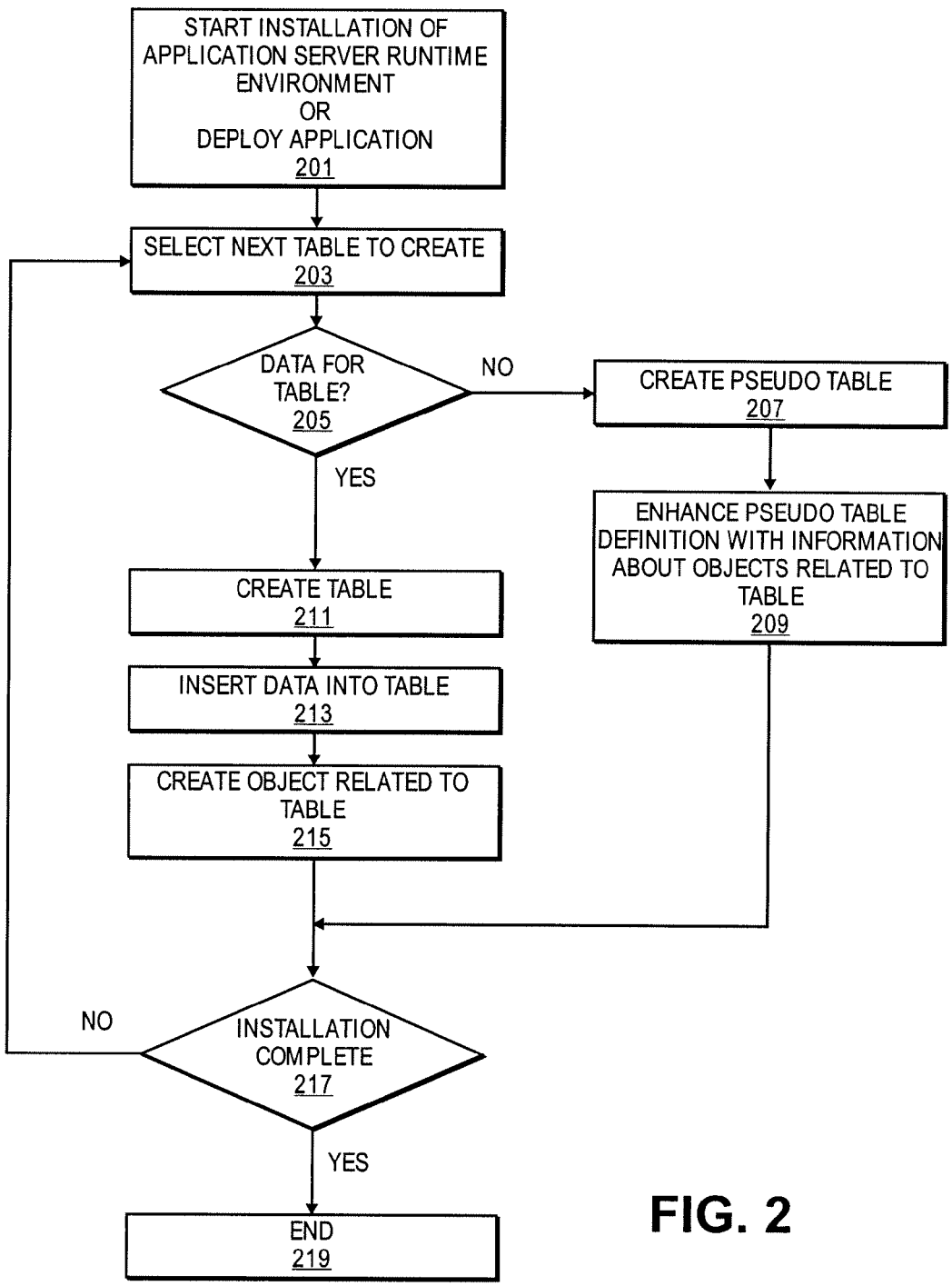
FIG. 2 is a flowchart of one embodiment of a process for managing table creation.

FIG. 2 is a flowchart of one embodiment of a process for managing table creation. In one embodiment, the table creation process is initiated when an application server is started or installed or when a set of application servers are started (block 201). The application server runtime environment can be installed at any time during the operation of a server machine. The application server runtime environment can be installed on a single server machine, workstation, or across any number and combination of machines.

In another embodiment, the table creation process is initiated at the time that an application is deployed or a set of applications is deployed in an application server runtime environment or similar environment (block 201). The applications may be any type of applications such as supply chain management applications, enterprise applications, accounting applications or similar programs. Any number of applications can be installed or deployed to the application server runtime environment. In one embodiment, the applications are deployed to a set of server machines that execute the application server runtime environment.

Each application server runtime environment or application being deployed may utilize a set of tables during its respective operation. These tables are stored in a set of databases. These databases may be local to the server machine or remote from the machine. Each table utilized by an application or application server runtime environment is expected by the respective application or application server to be created during the table creation process at installation or deployment. This includes tables that do not yet have any data to be stored in them.

The table creation process iterates through each table that is requested to be created by the applications or application server runtime service. The next table can be selected to be created (block 203) based on selection of any set of algorithms or schemes. A check is made for each table that is required by the application server runtime environment or applications. The check determines if there is data to be stored during the table creation process for the table selected to be created (block 205).

If there is data to be stored in the table during the table creation process at the installation or deployment time or any known data to be stored in the table at a subsequent time, then the table is created in the database (block 211). Any interface or relational database management system may be utilized to manipulate, create, updated, delete or modify tables. In one embodiment, a set of database processes receive commands to query, create and modify tables and process these requests and return the result to the requesting application or application server runtime environment.

In one embodiment, the data is inserted into the new table after its creation (block 213). The insertion of the data into the table occurs prior to the next table being created. In another embodiment, the data is inserted into the table at any time after creation. For example, data is inserted after all tables have been created.

After a table has been created, objects related to the table are created (block 215). For example, an index is created or updated for the table. Tables can be indexed for improved speed and efficiency in retrieving some data from the tables. Another example of an object related to a table is primary key-foreign key relationships such as check constraints or triggers. Any number of related objects can be created. In another embodiment, related objects are created after the table creation process completes or after the installation or deployment completes.

After the selected table has been created, the data stored and related objects created, then a check is made to determine if the installation has completed (block 217). This installation check determines if all required tables have been created for the application server runtime environment or each application being installed or deployed. If the installation has completed and all needed tables created, then the table creation process may complete (block 219). If the installation process has not completed and there are further tables to be processed, then the table creation process selects the next table (block 203). The process continues until the installation is complete and all needed tables have been processed for the installation or deployment.

If data is not determined to be present or known for a table that is to be created during the check (block 205), then a pseudo-table is created in place of the table (block 207). A pseudo-table can be a view or similar database mechanism. A view is a virtual or logical table composed of the result set of a query. Unlike normal tables in a database a view is not part of the physical schema of the database. Rather, it is a dynamic, virtual table computed or collated from data in the database or the view definition. Changing the data in a table alters the data shown in the view if the view definition contains a reference to that table. A view includes a set of metadata or a definition defining a set of data or operations (e.g., a query) on a set of tables. The set of tables referenced in a view definition may also be empty In one embodiment, all the pseudo-tables are created as views on an empty set of tables. The view definition assures that any query on the view will return an empty result set with the exact same structure as the corresponding empty table for which it is a substitute. The structure of the database view includes the exact same column names, column order and column types. A pseudo-table consumes fewer resources than a table. For example, a pseudo-table can occupy less than 32 kilobytes of space in a persistent storage device. Tables occupy more storage space and require more processor time for maintenance than a pseudo-table. This allocation of resources is wasted if a table contains no data. To reduce the resource consumption in the system, the pseudo-tables are utilized in place of the tables required by the application server runtime environment or application being installed or deployed.

In one embodiment, the pseudo-table definitions are enhanced to include information about objects related to the table that has been stored as a pseudo-table (block 209). For example, a table may be indexed to improve search efficiency for the database. If the table is represented by a pseudo-table, then the pseudo-table definition is enhanced to indicate that the table is indexed. This data can be used if the table is created to also create the index after the change of the pseudo-table to a table.

In one embodiment, after the creation of the pseudo-table and the enhancement of the pseudo-table, the table creation process checks to determine if the installation or deployment has completed (block 217). If the installation process has completed then, the table installation process completes (block 219). The installation process is complete, if all of the needed tables have been created as tables or pseudo-tables for each application or for the application server runtime environment.

Figure 3:
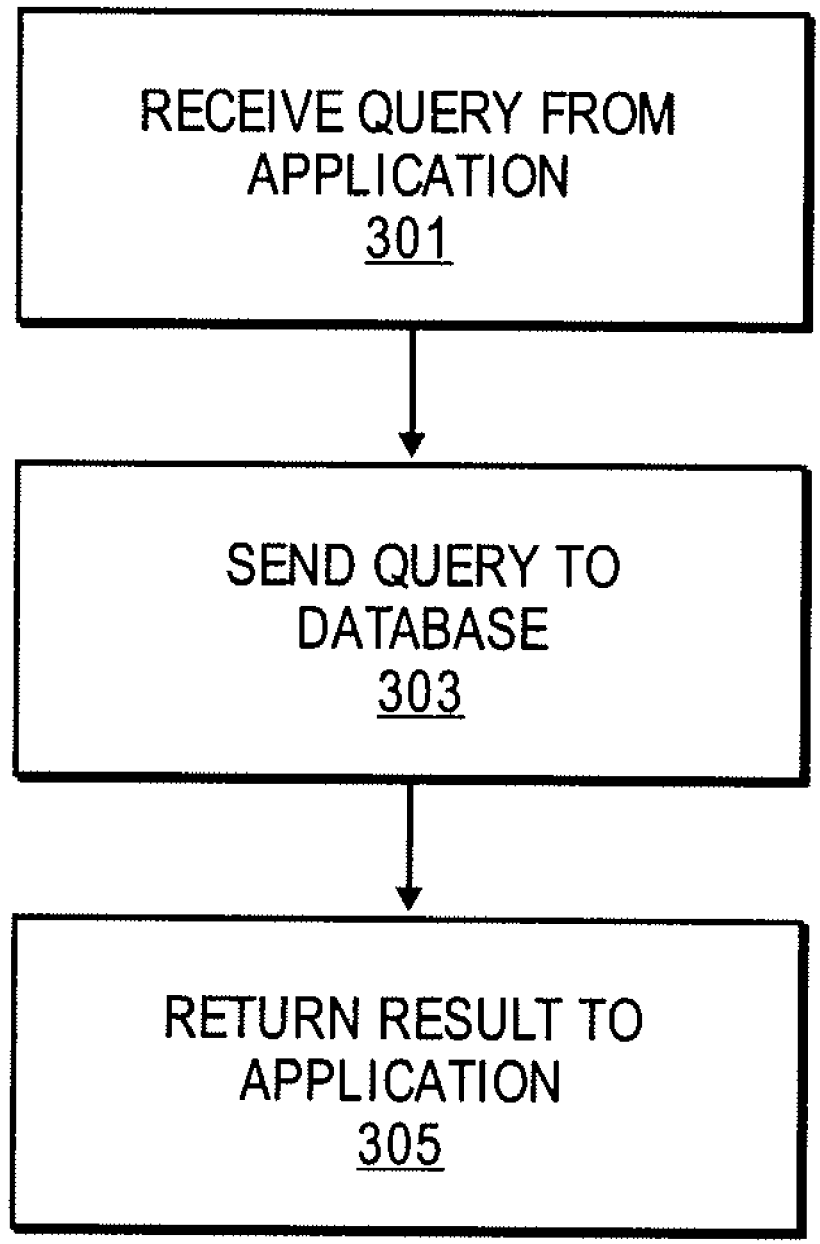
FIG. 3 is diagram of one embodiment of process for handling access to tables represented as pseudo-tables.

FIG. 3 is diagram of one embodiment of process for handling access to tables including tables represented as pseudo-tables. In one embodiment, the access process is initiated by the reception of a query from an application by the application server runtime environment or similar middleware (block 301). This access process is executed by the application middleware that intercepts the communications from the applications to the database. In another embodiment, this application middleware is the intended recipient of the application queries and similar communications from the applications. The queries can be in the form of structured query language (SQL), data manipulation language (DML) or similar languages or protocols.

The queries are passed on to the database for execution by the database processes (block 303). If the queries reference tables that are stored as pseudo-tables, the pseudo-tables are accessed and the database returns a result indicating the table was empty or the portion of the query relying on the empty table will obtain the same result from accessing the view as it would have from accessing the table. If the query does not reference a pseudo-table, then the query operation is performed on the table.

The result of the query operation is received by the application server or similar application middleware. The results are then sent to the application that generated the request (block 305). The results can be sent in any format or using any protocol or procedure.

FIG. 4A is a diagram of one embodiment of a process for updating or deleting data in a table or pseudo-table. The application middleware or application server runtime environment initiates this process upon receiving a request for an update or deletion of a set of entries of a table (block 401). These requests can be in the form of SQL (DML) or similar languages or formats. The application middleware or application server intercepts and forwards requests from the applications destined for the database or allows requests to pass through to the database (block 403).

The database processes the request to update or delete entries in the database. If the entries to be modified are in tables in the database, then the operations are performed normally. A result or indicator of success is then returned to the application server runtime environment or similar application middleware. If the entries or table to be modified are not present in the database, then an error is generated. The error is returned as a result or similar indicator to the application middleware. The application server or middleware checks the results of the operation to update or delete the database (block 405).

If the update or deletion operation was successful, then the successful result or indicator of success is passed on to the application that generated the request (block 407). The data can be passed through to the application or resent via any communication protocol or format to the requesting application.

If the update or deletion operation was not successful, then the application middleware or server checks the returned error to determine the type of the error (block 409). If the error was caused by the table being represented by a pseudo-table, then the application middleware or server returns a 'not found' message or indicator to the requesting application (block 411). This replacement of the error with the 'not found' message is transparent to the requesting application. If the error was not caused by the representation of the table by a pseudo-table, then the error is returned to the requesting application (block 413). The error is returned to the requesting application in any format or through any protocol. The requesting application may use any interface, including call level interface (CLI), Oracle call interface (OCI), Java database connectivity (JDBC), open database connectivity (ODBC) or similar interface.

FIG. 4B is a diagram of another embodiment of a process for updating or deleting data. The application middleware, such as an application server runtime environment, initiates this process upon receiving a request for an update or deletion of a set of entries of a table (block 451). These requests are in the form of SQL (DML) or similar languages or formats. The application middleware or application server intercepts and forwards requests from the applications destined for the database or allows requests to pass through to the database (block 453).

The database processes the request to update or delete entries in the database. If the entries to be modified are in tables in the database, then the operations are performed normally. A result or indicator of success is then returned to the application middleware. If the entries or table to be modified are not present in the database, then an error is generated. The error is returned as a result or similar indicator to the application middleware or server. The application middleware checks the results of the operation to update or delete the database (block 455).

If the update or deletion operation was successful, then the successful result or indicator of success is passed on to the application that generated the request (block 457). The data may be passed through to the application or be resent via any communication protocol or format to the requesting application.

If the update or deletion operation was not successful, then the application middleware checks the returned error to determine the type of the error (block 459). If the error was caused by the table being represented by a pseudo-table, then the application middleware replaces the pseudo-table with a table (block 461). This replacement of pseudo-table with a table may utilize metadata or a definition within the pseudo-table data to generate the corresponding table and objects related to the table. The process of replacing the pseudo-table with the table is transparent to the requesting application. The request is then retried with the table in the database and the pseudo-table removed from the database (block 453).

If the error was not caused by the representation of the table by a pseudo-table, then the error is returned to the requesting application (block 463). The error can be returned to the requesting application in any format or through any protocol to the requesting application including CLI, OCI, JDBC, ODBC or similar interfaces.

Figure 5:
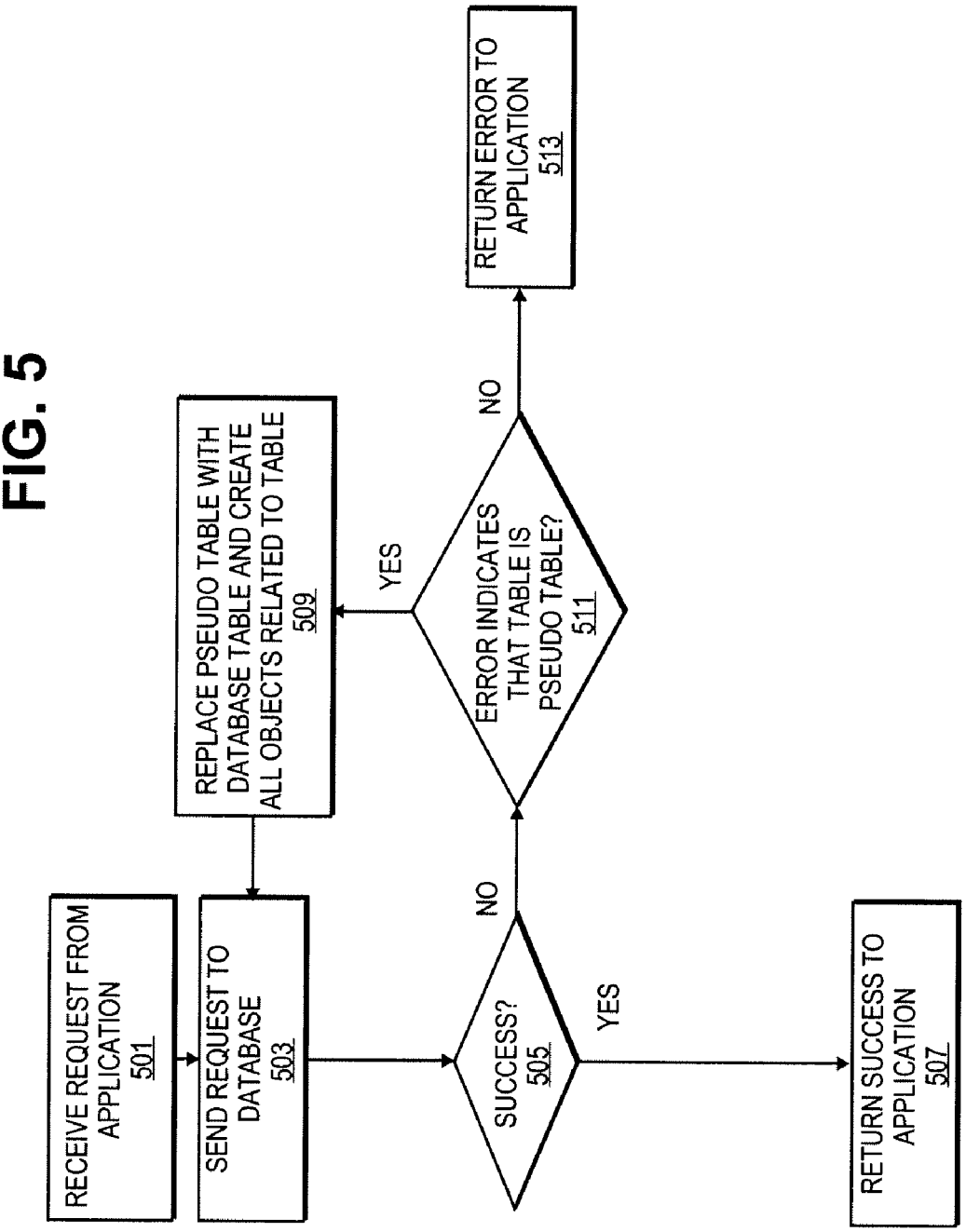
FIG. 5 is a diagram of one embodiment of a process for inserting data into a database table.

FIG. 5 is a diagram of one embodiment of a process for inserting data into a table. The application middleware, such as the application server runtime environment, initiates this process upon receiving a request for an insertion of a set of entries into a table (block 511). These requests are in the form of SQL (DML) or similar languages or formats. The application middleware or application server intercepts and forwards requests from the applications destined for the database or allows requests to pass through to the database (block 503).

The database processes the request to insert entries in the database. If the entries to be inserted are destined for tables in the database, then the operations are performed normally. A result or indicator of success is then returned to the application middleware. If the table into which the entries are to be inserted is not present in the database, then an error is generated. The error is returned as a result or similar indicator to the application middleware. The application middleware checks the results of the operation to insert the set of entries into the database (block 505).

If the insertion operation was successful, then the successful result or indicator of success is passed on to the application that generated the request (block 507). The data can be passed through to the application or be resent via any communication protocol or format to the requesting application.

If the insertion operation was not successful, then the application middleware checks the returned error to determine the type of the error (block 511). If the error was caused by the table being represented by a pseudo-table, then the application middleware or server replaces the pseudo-table with a table (block 509). This replacement of a pseudo-table with a table utilizes metadata or a definition within the pseudo-table data to generate the corresponding table and all objects related to that table. The process of replacing the pseudo-table with the table is transparent to the requesting application. The requested insertion operation is then retried with the table in the database and the pseudo-table removed from the database (block 503).

If the error was not caused by the representation of the table by a pseudo-table, then the error is returned to the requesting application (block 513). The error can be returned to the requesting application in any format or through any protocol including CLI, OCI, JDBC, ODBC or similar interfaces.

FIG. 6A is a diagram of one embodiment of a process to service a modification of a table structure or object related to a table. The application middleware or application server runtime environment initiates this process upon receiving a request for an update to a definition of a table or a set of objects related to a table (block 601). These requests can be in the form of SQL (DDL) or similar languages or formats. The application middleware or application server intercepts and forwards requests from the applications destined for the database or allows requests to pass through to the database (block 603).

The database processes the request to modify tables or related objects in the database. If the tables or related objects to be modified are in the database, then the operations are performed normally. A result or indicator of success is then returned to the application middleware. If the table or related objects to be modified are not present in the database, then an error is generated. The error is returned as a result or similar indicator to the application middleware. The application middleware checks the results of the operation to modify a table or related object in the database (block 605).

If the modification operation was successful, then the successful result or indicator of success is passed on to the application that generated the request (block 607). The data can be passed through to the application or resent via any communication protocol or format to the requesting application.

If the modification operation was not successful, then the application middleware or server checks the returned error to determine the type of the error (block 609). If the error was caused by the table being represented by a pseudo-table, then the application middleware updates or modifies the pseudo-table to incorporate the modifications intended for the table (block 613). This modification of the pseudo-table instead of the table is transparent to the requesting application. If the table is subsequently created, it will be created with the properties defined by the pseudo-table. If the error was not caused by the representation of the table by a pseudo-table, then the error is returned to the requesting application (block 611). The error can be returned to the requesting application in any format or through any protocol including CLI, OCI, JDBC, ODBC or similar interfaces.

FIG. 6B is a diagram of another embodiment of a process modification of a table structure or object related to a table. The application middleware or application server runtime environment initiates this process upon receiving a request for an update or modification of the properties or definition of a table or an object related to the table (block 651). These requests can be in the form of SQL (DDL) or similar languages or formats. The application middleware or application server intercepts and forwards requests from the applications destined for the database or allows requests to pass through to the database (block 653).

The database processes the request to modify a table or related objects in the database. If the tables or objects to be modified are in tables in the database then the operations are performed normally. A result or indicator of success is then returned to the application middleware or application server. If the table or objects to be modified are not present in the database, then an error is generated. The error is returned as a result or similar indicator to the application middleware. The application middleware checks the results of the modification operation (block 655).

If the modification operation was successful, then the successful result or indicator of success is passed on to the application that generated the request (block 657). The data may be passed through to the application or be resent via any communication protocol or format to the requesting application.

If the modification operation was not successful, then the application middleware or server checks the returned error to determine the type of the error (block 661). If the error was caused by the table being represented by a pseudo-table, then the application middleware replaces the pseudo-table with a table (block 659). This replacement of a pseudo-table with a table utilizes metadata or a definition within the pseudo-table data to generate the corresponding table and all objects related to that table. The process of replacing the pseudo-table with the table is transparent to the requesting application. The modification request is then retried with the table in the database and the pseudo-table removed from the database (block 653).

If the error was not caused by the representation of the table by a pseudo-table, then the error is returned to the requesting application (block 663). The error can be returned to the requesting application in any format or through any protocol including CLI, OCI, JDBC, ODBC or similar interfaces.

In one embodiment, the database resource conservation system is implemented as a set of hardware devices. In another embodiment, these components may be implemented in software (e.g., microcode, assembly language or higher level languages). These software implementations may be stored on a machine-readable medium. A "machine readable" medium may include any medium that can store or transfer information. Examples of a machine readable medium include a ROM, a floppy diskette, a CD-ROM, a DVD, flash memory, hard drive, an optical disk or similar medium.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:
receiving a request to create a table;
determining whether the table is an empty table; and
storing a pseudo-table in a data store in response to determining the table to be empty, the pseudo-table stored in place of the table by a middleware implemented by a computer system.

2. The method of claim 1, wherein the pseudo-table is a database view.

3. The method of claim 1, further comprising:
storing metadata with the pseudo-table to describe characteristics of the table.

4. The method of claim 3, wherein the metadata includes a table creation command.

5. The method of claim 3, wherein the metadata includes characteristics of data objects related to the table.

6. The method of claim 3, wherein the metadata describes an index, triggers, or check constraints related to the table.

7. A method comprising:
intercepting a database command from an application by a middleware implemented by a computer system, the database command to access a table that is stored as a pseudo-table the pseudo-table stored in place of the table;
returning a result of the database command to the application.

8. The method of claim 7, further comprising:
generating a table in response to intercepting the database command, the database command to modify the table.

9. The method of claim 7, further comprising:
returning an indication that data is not found to the application in response to intercepting the database command, the database command to delete or update data.

10. The method of claim 7, further comprising:
modifying a definition of the pseudo-table in response to intercepting the database command, the database command to modify a structure of the table.

11. The method of claim 7, further comprising:
determining whether an error message received in response to execution of the database command is caused by the pseudo-table.

12. The method of claim 7, wherein the pseudo-table is a database view.

13. A system comprising:
a data store to store a plurality of tables and pseudo-tables; and
a processor and memory to provide an application and middleware, the application to utilize the plurality of tables and the middleware to manage pseudo-table and table creation and to store a pseudo-table in place of a table transparent to the application to conserve space in the database.

14. The system of claim 13, wherein the middleware intercepts and processes results of database commands to manage the pseudo-table and table creation.

15. The system of claim 13, wherein the middleware manages pseudo-table and table creation for the application transparently.

16. A machine readable medium having a set of instructions stored therein which when executed cause a machine to perform a set of operations comprising:
  receiving a request to modify a table in a data store;
  checking for a pseudo-table stored in place of the table in the data store;
  retrieving a pseudo-table definition; and
  modifying the pseudo-table definition to reflect a modification to the table.

17. The machine readable medium of claim 16, having a further set of instructions stored therein which when executed cause a machine to perform a set of operations further comprising:
  modifying the pseudo-table definition to indicate a property of an object related to the table.

18. The machine readable medium of claim 17, wherein the object is any one of an index, trigger or check constraint related to the table.

19. The machine readable medium of claim 16, wherein the pseudo-table is a database view.

20. The machine readable medium of claim 16, having a further set of instructions stored therein which when executed cause a machine to perform a set of operations further comprising:
  deleting the pseudo-table after generating a corresponding table.

* * * * *

UNITED STATES PATENT AND TRADEMARK OFFICE
CERTIFICATE OF CORRECTION

| | | |
|---|---|---|
| PATENT NO. | : 7,702,696 B2 | Page 1 of 1 |
| APPLICATION NO. | : 11/787617 | |
| DATED | : April 20, 2010 | |
| INVENTOR(S) | : Torsten Zieler and Frank-Martin Haas et al. | |

It is certified that error appears in the above-identified patent and that said Letters Patent is hereby corrected as shown below:

On the Title Page, in Item [75], under Inventors, please delete "Dlelheim" and insert --Dielheim--.

Signed and Sealed this
Fourteenth Day of February, 2012

David J. Kappos
*Director of the United States Patent and Trademark Office*